United States Patent

Abe

[11] Patent Number: 5,886,790
[45] Date of Patent: Mar. 23, 1999

[54] IMAGE PROCESSING DEVICE

[75] Inventor: Nobuaki Abe, Hokkaido, Japan

[73] Assignee: Asahi Kogaku Kogyo Kabushiki Kaisha, Tokyo, Japan

[21] Appl. No.: 678,707

[22] Filed: Jul. 11, 1996

[30] Foreign Application Priority Data

Jul. 12, 1995 [JP] Japan ..................... 7-199112

[51] Int. Cl.⁶ .......................... H04N 1/417; H04N 1/415; H04N 1/41
[52] U.S. Cl. ..................... 358/261.2; 358/261.3; 358/426; 358/427; 358/432; 358/433; 382/248
[58] Field of Search ............... 358/261.2, 261.3, 358/433, 426, 427, 430, 432, 500, 539; 382/248, 250; 348/403, 395

[56] References Cited

U.S. PATENT DOCUMENTS

| | | | |
|---|---|---|---|
| 5,166,987 | 11/1992 | Kageyama | 382/250 |
| 5,299,025 | 3/1994 | Shirasawa | 358/433 |
| 5,311,307 | 5/1994 | Yoshimoto | 348/403 |
| 5,333,212 | 7/1994 | Ligtenberg | 382/250 |
| 5,657,399 | 8/1997 | Iwabuchi et al. | 382/250 |
| 5,719,958 | 2/1998 | Wober et al. | 382/250 |

OTHER PUBLICATIONS

"Digital Signal Processing Handbook" 1st ed., Ohm Press, Tokyo, Japan on Jan. 31, 1993, pp. 70–82, and an English Translation thereof.

*Primary Examiner*—Kim Yen Vu
*Assistant Examiner*—Mark Wallerson
*Attorney, Agent, or Firm*—Greenblum & Bernstein, P.L.C.

[57] ABSTRACT

A device for processing image data for inputted image data composed of blocks, each of which has 64 pixels values arranged in a matrix. Each of the pixel values is inputted to one of first through fourth stages forming a pre-processing unit. Each of the stages has 16 addition and subtraction units. Four pixels positioned at predetermined locations in the matrix are inputted to a predetermined addition and subtraction unit, so that the four pixels are subjected to addition and subtraction, and a part of a two-dimensional DCT. Thus, 64 pre-processed DCT coefficients are obtained. The pre-processed DCT coefficients are inputted to the post-processing unit, in which the remaining part of the two-dimensional DCT and the quantization are performed, so that the quantization DCT coefficients are obtained.

18 Claims, 12 Drawing Sheets

FIG.2

8×8 PIXEL BLOCK $$P_{yx} = \begin{bmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 174 & 172 & 174 & 166 \\ 173 & 172 & 175 & 173 & 180 & 181 & 177 & 172 \end{bmatrix}$$

⬇ DCT

DCT COEFFICIENTS $$F_{vu} = \begin{bmatrix} 260 & 49 & -16 & 5 & 2 & 4 & 0 & 0 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{bmatrix}$$

with labels $F_{00}$, $F_{01}$, $F_{10}$, $F_{77}$

QUANTIZATION TABLE Q1

$$Q_{vu} = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

⬇ QUANT.

QUANTIZED DCT COEFFICIENTS $$R_{vu} = \begin{bmatrix} 16 & 4 & -2 & 0 & 0 & 0 & 0 & 0 \\ -7 & 3 & 0 & 0 & 0 & 0 & 0 & 0 \\ 0 & -1 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

with label $R_{00}$

FIG.4

|  | x (or y) | | | | | | | | |
|---|---|---|---|---|---|---|---|---|---|
| u (or v) | | 0 | 1 | 2 | 3 | 4 | 5 | 6 | 7 |
| 0 | | c[4] | c[4] | c[4] | c[4] | c[4] | c[4] | c[4] | c[4] |
| 1 | | c[1] | c[3] | c[5] | c[7] | -c[7] | -c[5] | -c[3] | -c[1] |
| 2 | | c[2] | c[6] | -c[6] | -c[2] | -c[2] | -c[6] | c[6] | c[2] |
| 3 | | c[3] | -c[7] | -c[1] | -c[5] | c[5] | c[1] | c[7] | -c[3] |
| 4 | | c[4] | -c[4] | -c[4] | c[4] | c[4] | -c[4] | -c[4] | c[4] |
| 5 | | c[5] | -c[1] | c[7] | c[3] | -c[3] | -c[7] | c[1] | -c[5] |
| 6 | | c[6] | -c[2] | c[2] | -c[6] | -c[6] | c[2] | -c[2] | c[6] |
| 7 | | c[7] | -c[5] | c[3] | -c[1] | c[1] | -c[3] | c[5] | -c[7] |

COSINE COEFFICIENTS OF F42

| y \ x | 0 | 1 | 2 | 3 | 4 | 5 | 6 | 7 |
|---|---|---|---|---|---|---|---|---|
|  |  | c[2] | c[6] | −c[6] | −c[2] | −c[2] | −c[6] | c[6] | c[2] |
| c[4] | 0 | c[2,4] | c[6,4] | −c[6,4] | −c[2,4] | −c[2,4] | −c[6,4] | c[6,4] | c[2,4] |
| −c[4] | 1 | −c[2,4] | −c[6,4] | c[6,4] | c[2,4] | c[2,4] | c[6,4] | −c[6,4] | −c[2,4] |
| −c[4] | 2 | −c[2,4] | c[6,4] | −c[6,4] | c[2,4] | c[2,4] | −c[6,4] | c[6,4] | −c[2,4] |
| c[4] | 3 | c[2,4] | −c[6,4] | c[6,4] | −c[2,4] | −c[2,4] | c[6,4] | −c[6,4] | c[2,4] |
| c[4] | 4 | c[2,4] | c[6,4] | −c[6,4] | −c[2,4] | −c[2,4] | −c[6,4] | c[6,4] | c[2,4] |
| −c[4] | 5 | −c[2,4] | −c[6,4] | c[6,4] | c[2,4] | c[2,4] | c[6,4] | −c[6,4] | −c[2,4] |
| −c[4] | 6 | −c[2,4] | c[6,4] | −c[6,4] | c[2,4] | c[2,4] | −c[6,4] | c[6,4] | −c[2,4] |
| c[4] | 7 | c[2,4] | −c[6,4] | c[6,4] | −c[2,4] | −c[2,4] | c[6,4] | −c[6,4] | c[2,4] |

FIG.6

COSINE COEFFICIENTS OF F31

| | | 0 | 1 | 2 | 3 | 4 | 5 | 6 | 7 | ← U2 |
|---|---|---|---|---|---|---|---|---|---|---|
| | | c[1] | c[3] | c[5] | c[7] | -c[7] | -c[5] | -c[3] | -c[1] | |
| c[3] | 0 | c[1,3] | c[3,3] | c[3,5] | c[3,7] | -c[3,7] | -c[3,5] | -c[3,3] | -c[1,3] | |
| -c[7] | 1 | -c[1,7] | -c[3,7] | -c[5,7] | -c[7,7] | c[7,7] | c[5,7] | c[3,7] | c[1,7] | |
| -c[1] | 2 | -c[1,1] | -c[1,3] | -c[1,5] | -c[1,7] | c[1,7] | c[1,5] | c[1,3] | c[1,1] | |
| -c[5] | 3 | -c[1,5] | -c[3,5] | -c[5,5] | -c[5,7] | c[5,7] | c[5,5] | c[3,5] | c[1,5] | |
| c[5] | 4 | c[1,5] | c[3,5] | c[5,5] | c[5,7] | -c[5,7] | -c[5,5] | -c[3,5] | -c[1,5] | |
| c[1] | 5 | c[1,1] | c[1,3] | c[1,5] | c[1,7] | -c[1,7] | -c[1,5] | -c[1,3] | -c[1,1] | |
| c[7] | 6 | c[1,7] | c[3,7] | c[5,7] | c[7,7] | -c[7,7] | -c[5,7] | -c[3,7] | -c[1,7] | |
| -c[3] | 7 | -c[1,3] | -c[3,3] | -c[3,5] | -c[3,7] | c[3,7] | c[3,5] | c[3,3] | c[1,3] | |

| $I_{00}$ | $I_{01}$ | $I_{02}$ | $I_{03}$ |
|---|---|---|---|
| $I_{10}$ | $I_{11}$ | $I_{12}$ | $I_{13}$ |
| $I_{20}$ | $I_{21}$ | $I_{22}$ | $I_{23}$ |
| $I_{30}$ | $I_{31}$ | $I_{32}$ | $I_{33}$ |

S3

| $K_{00}$ | $K_{01}$ | $K_{02}$ | $K_{03}$ |
|---|---|---|---|
| $K_{10}$ | $K_{11}$ | $K_{12}$ | $K_{13}$ |
| $K_{20}$ | $K_{21}$ | $K_{22}$ | $K_{23}$ |
| $K_{30}$ | $K_{31}$ | $K_{32}$ | $K_{33}$ |

S2

| $J_{00}$ | $J_{01}$ | $J_{02}$ | $J_{03}$ |
|---|---|---|---|
| $J_{10}$ | $J_{11}$ | $J_{12}$ | $J_{13}$ |
| $J_{20}$ | $J_{21}$ | $J_{22}$ | $J_{23}$ |
| $J_{30}$ | $J_{31}$ | $J_{32}$ | $J_{33}$ |

S4

| $L_{00}$ | $L_{01}$ | $L_{02}$ | $L_{03}$ |
|---|---|---|---|
| $L_{10}$ | $L_{11}$ | $L_{12}$ | $L_{13}$ |
| $L_{20}$ | $L_{21}$ | $L_{22}$ | $L_{23}$ |
| $L_{30}$ | $L_{31}$ | $L_{32}$ | $L_{33}$ |

FIG.10

| | | u | | | | | | | |
|---|---|---|---|---|---|---|---|---|---|
| | | 0 | 4 | 2 | 6 | 1 | 3 | 5 | 7 |
| v | 0 | | | | | | | | |
| | 4 | (A1) | | | (A2) | (A4) | | | |
| | 2 | S1 | | | | S3 | | | |
| | 6 | (A2) | | | (A3) | (A5) | | | |
| | 1 | | | | | | | | |
| | 3 | (A4) | | | | | | | |
| | 5 | S2 | | | (A5) | (A6) | S4 | | |
| | 7 | | | | | | | | |

FIG.11

| | USED COSINE COEF. | NUMBER OF MLT. | NUMBER OF $F_{vu}$ |
|---|---|---|---|
| (A1) | c[4,4] | 1(0) | 4 |
| (A2) | c[4,2]. c[4,6] | 2 | 8 |
| (A3) | c[2,2]. c[2,6]. c[6,6] | 3(2) | 4 |
| (A4) | c[4,1]. c[4,3]. c[4,5]. c[4,7] | 4 | 16 |
| (A5) | c[2,1]. c[2,3]. c[2,5]. c[2,7]<br>c[6,1]. c[6,3]. c[6,5]. c[6,7] | 8 | 16 |
| (A6) | c[1,1]. c[1,3]. c[1,5]. c[1,7]<br>c[3,3]. c[3,5]. c[3,7]<br>c[5,5]. c[5,7]<br>c[7,7] | 10(8) | 16 |

FIG.12

| × 1/4 | | u | | | | | | | |
|---|---|---|---|---|---|---|---|---|---|
| | | 0 | 1 | 2 | 3 | 4 | 5 | 6 | 7 |
| v | 0 | 1/2 | c[1]/2 | c[4,2] | c[3]/2 | 1/2 | c[5]/2 | c[4,6] | c[7]/2 |
| | 1 | c[1]/2 | 1/2 | c[1,2]/√2 | 1/2 | c[1]/2 | 1/2 | c[1,6]/√2 | 1/2 |
| | 2 | c[2,4] | c[2,1]/√2 | c[6,2] | c[2,3]/√2 | c[2,4] | c[2,5]/√2 | c[2,6] | c[2,7]/√2 |
| | 3 | c[3]/2 | 1/2 | c[3,2]/√2 | 1/2 | c[3]/2 | 1/2 | c[3,6]/√2 | 1/2 |
| | 4 | 1/2 | c[1]/2 | c[4,2] | c[3]/2 | 1/2 | c[5]/2 | c[4,6] | c[7]/2 |
| | 5 | c[5]/2 | 1/2 | c[5,2]/√2 | 1/2 | c[5]/2 | 1/2 | c[5,6]/√2 | 1/2 |
| | 6 | c[6,4] | c[6,1]/√2 | c[6,2] | c[6,3]/√2 | c[6,4] | c[6,5]/√2 | c[2,6] | c[6,7]/√2 |
| | 7 | c[7]/2 | 1/2 | c[7,2]/√2 | 1/2 | c[7]/2 | 1/2 | c[7,6]/√2 | 1/2 |

FIG.13

| v \ u | 0 | 1 | 2 | 3 | 4 | 5 | 6 | 7 |
|---|---|---|---|---|---|---|---|---|
| 0 | 16 | 11 | 10 | 16 | 24 | 40 | 51 | 61 |
| 1 | 12 | 12 | 14 | 19 | 26 | 58 | 60 | 55 |
| 2 | 14 | 13 | 16 | 24 | 40 | 57 | 69 | 56 |
| 3 | 14 | 17 | 22 | 29 | 51 | 87 | 80 | 62 |
| 4 | 18 | 22 | 37 | 56 | 68 | 109 | 103 | 77 |
| 5 | 24 | 35 | 55 | 64 | 81 | 104 | 113 | 92 |
| 6 | 49 | 64 | 78 | 87 | 103 | 121 | 120 | 101 |
| 7 | 72 | 92 | 95 | 98 | 112 | 100 | 103 | 99 |

FIG.14

| $10^{-3}$ | | u | | | | | | | |
|---|---|---|---|---|---|---|---|---|---|
| | | 0 | 1 | 2 | 3 | 4 | 5 | 6 | 7 |
| v | 0 | 7.8125 | 11.145 | 16.332 | 6.4959 | 5.2083 | 1.7362 | 1.3265 | 0.3998 |
| | 1 | 10.217 | 10.417 | 11.442 | 6.5789 | 4.7153 | 2.1552 | 1.1058 | 2.2727 |
| | 2 | 11.666 | 12.322 | 5.5243 | 5.6582 | 4.0830 | 1.5919 | 1.2810 | 0.5690 |
| | 3 | 7.4238 | 7.3529 | 6.1725 | 4.3103 | 2.0379 | 1.4368 | 0.7031 | 2.0161 |
| | 4 | 6.9444 | 5.5726 | 4.4141 | 1.8560 | 1.8382 | 0.6371 | 0.6568 | 0.3167 |
| | 5 | 2.8936 | 3.5714 | 1.6497 | 1.9531 | 0.8574 | 1.2019 | 0.3326 | 1.3587 |
| | 6 | 1.3806 | 1.0367 | 1.1332 | 0.6465 | 0.6568 | 0.3106 | 0.7366 | 0.1307 |
| | 7 | 0.3387 | 1.3587 | 0.3354 | 1.2755 | 0.2177 | 1.25 | 0.1281 | 1.2626 |

IMAGE PROCESSING DEVICE

BACKGROUND OF THE INVENTION

1. Field of the Invention

The present invention is related to an image signal compressing device for compressing a color still image in accordance with a JPEG (Joint Photographic Expert Group) algorithm. More particularly, the present invention is related to an improvement in the speed at which a discrete cosine transformation (DCT) in a compression process is performed.

2. Description of the Related Art

A standard algorithm for the encoding of high resolution images and the transfer of that information through telecommunication transmission channels has been recommended by the JPEG. In order to enable a large-scale data compression, the baseline process of the JPEG algorithm breaks down the original image data into components on a spatial frequency axis using a two-dimensional DCT. Thereafter, data expressed on the spatial frequency axis is quantized by using a quantization table. The quantized data is then encoded using a Huffman table.

In the two-dimensional DCT and in the quantization process, multiplications, additions and subtractions are carried out many times, respectively. Multiplication is a more complicated process than the addition and the subtraction. Therefore, the larger the number of times a multiplication is carried out, the longer the calculation time in the two-dimensional DC and the quantization. The conventional method in which the number of multiplications is reduced, thus increasing the calculation speed, was proposed in "High Speed Calculation Algorithm of Orthogonal Transformation" (Digital Signal Process Handbook, Ohm Company Limited, issued in 1993). This method however, was provided for the processing of one-dimensional DCT. Therefore, if the method is carried out twice, the method can be applied to a two-dimensional DCT, but there is an upward limit on the calculation speed.

SUMMARY OF THE INVENTION

Accordingly, an object of the invention is to provide an image processing device by which the two-dimensional DCT and the quantization are carried out at high speed.

According to the present invention, there is provided an image processing device, in which original image data composed of pixel values which are arranged in a matrix are inputted, the pixel values are subjected to a two dimensional discrete cosine transformation (DCT) to obtain a DCT coefficient for each of spacial frequencies, and the DCT coefficient is quantized by a quantization coefficient included in a quantization table to obtain a quantized DCT coefficient, the device comprising a pre-process unit, a classifying unit, a pixel value input unit, and a post-process unit.

The pre-process unit obtains pre-processed DCT coefficients corresponding to the pixel values. The pre-process unit is divided into a plurality of stages in accordance with cosine coefficients used in the two dimensional DCT. The pre-processed DCT coefficients are obtained by applying a calculation, which corresponds to the cosine coefficients, to the pixel values in each of the stages. The classifying unit classifies the pixel values into groups composed of a predetermined number of pixel values in which their disposition in the matrix arrangement are symmetric and which are multiplied by cosine coefficients having the same absolute value. The pixel value input unit inputs the pixel values belonging to each of the groups into the plurality of stages, respectively. The post-process unit performs a post-process in which the pre-processed DCT coefficients are multiplied by post-process coefficients, which are generated based on the quantization coefficients and multiplying terms corresponding to the cosine coefficients, to obtain the quantized DCT coefficients.

Furthermore, according to the present invention, there is provided an image processing device applying the two-dimensional DCT to original image data to obtain DCT coefficients, and then applying a quantization to each of the DCT coefficients to obtain quantized DCT coefficients, the device comprising a generating unit, and first and second applying units.

The generating unit generates pixel groups in accordance with pixel values which form the original image data and are arranged in a matrix. Each of the pixel groups is composed of a predetermined number of the pixel values which are symmetrically disposed in the matrix arrangement. The first applying unit applies a pre-process to the pixel values to obtain pre-processed DCT coefficients corresponding to the pixel values. The pre-process unit is divided into a plurality of stages in accordance with cosine coefficients used in the two dimensional DCT. The pre-processed DCT coefficients are obtained by applying a calculation which corresponds to the cosine coefficients, to the pixel values in each of the stages. The second applying unit applies a post-process in which the pre-processed DCT coefficients are multiplied by post-process coefficients, which are generated based on the quantization coefficients and multiplying terms corresponding to the cosine coefficients, to obtain the quantized DCT coefficients.

BRIEF DESCRIPTION OF THE DRAWINGS

The present invention will be better understood from the description of the preferred embodiments of the invention set forth below, together with the accompanying drawings, in which:

FIG. 2 is a view of an example of image data Pyx, a DCT coefficient Fvu, a quantized DCT coefficient Rvu, and a quantization table Qvu;

FIG. 4 is a view showing cosine values corresponding to spatial coordinates and spatial frequency parameters;

FIG. 5 is a view showing cosine coefficients of F42;

FIG. 6 is a view showing cosine coefficients of F31;

FIG. 9 is a view showing a construction of a pre-processing unit which is a part of the image processing device;

FIG. 10 is a view showing a relationship between each of stages S1 though S4 of the pre-processing unit and the spatial frequencies f(u,v) calculated in these stages S1 through S4;

FIG. 11 is a view showing cosine coefficients used in first through sixth areas of the pre-processing unit;

FIG. 12 is a view showing multiplying terms in each of the spatial frequencies;

FIG. 13 is a view showing a quantization table of the luminance recommended by the JPEG; and FIG. 14 is a view showing a multiplying term and quantization table.

DESCRIPTION OF THE PREFERRED EMBODIMENTS

Figure 1:
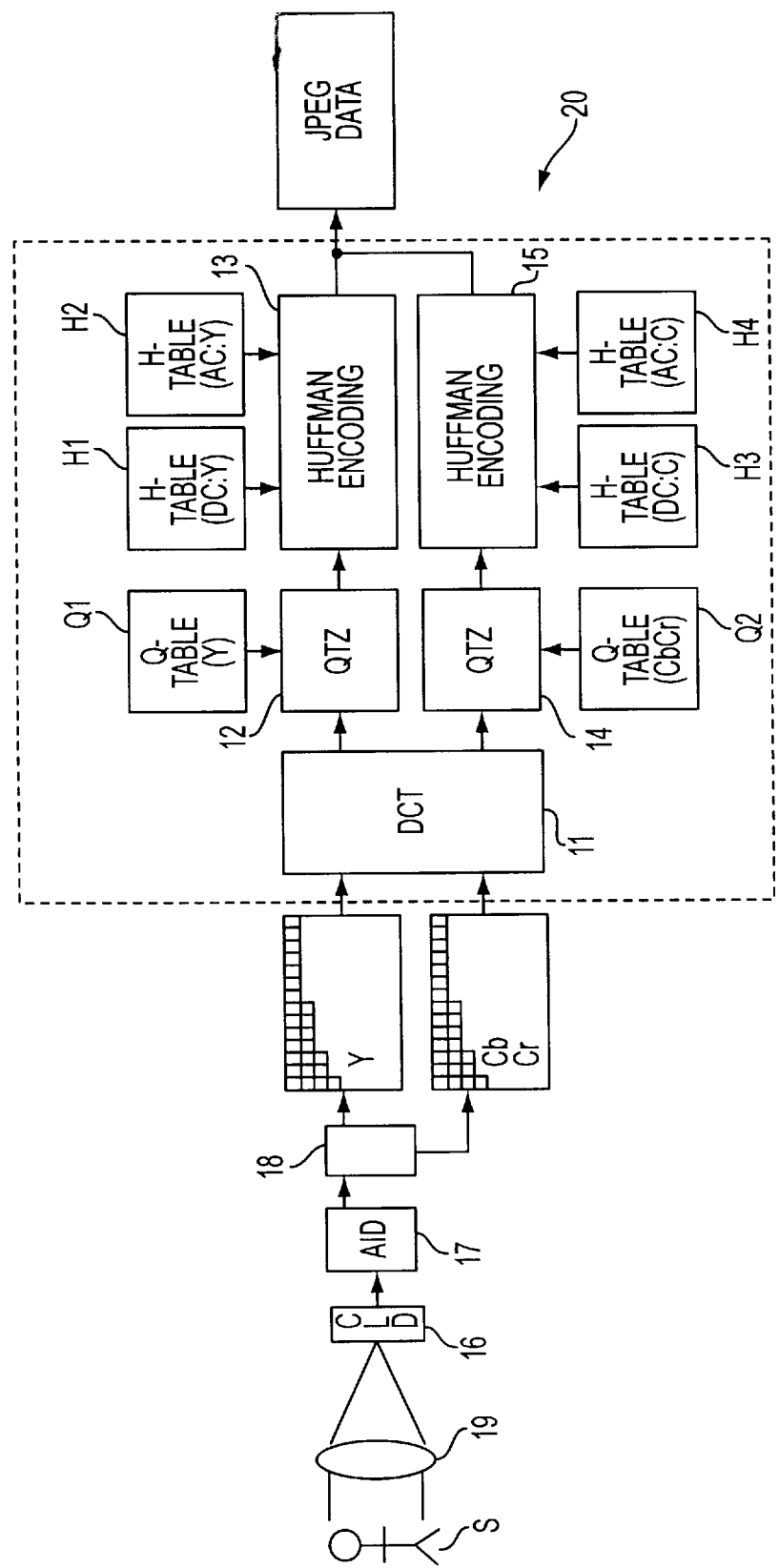
FIG. 1 is a block diagram showing an image compression device of an embodiment of the present invention.

The present invention will be described below with reference to embodiments shown in the drawings.

FIG. 1 is a block diagram of an image signal compressing device of an embodiment of the present invention, by which device luminance signals (Y data) and color differential signals (Cb data and Cr data) are compressed according to the JPEG algorithm. Light reflected from a subject S passes through an imaging optical system 19 such that the reflected light is focused on a CCD (charge coupled device) 16. The CCD 16 produces charges which are representative of the quantity of light incident thereon, and outputs an analog signal to an A/D converter 17. The A/D converter 17 converts the analog signal to a digital image signal which is input to a signal processing unit 18. The signal processing unit 18 converts the image signal into Y data, Cb data and Cr data, which are inputted to the image processing device 20 to be compressed into JPEG data. In accordance with the present invention, the signal processing unit 18 may be, for example, a conventional digital signal processor (DSP) programmed to convert the image data as described above.

The Y data is subjected to a two-dimensional discrete cosine transformation (two-dimensional DCT) in a DCT processing unit 11 to be converted to DCT coefficients. The DCT coefficients of the Y data are inputted to the a first quantization processing unit 12, in which the DCT coefficients are quantized using a first quantization table Q1 so that quantized DCT coefficients are obtained. The quantized DCT coefficients of the Y data are Huffman-encoded in a first Huffman encoding processing unit 13, using a first Huffman table H1 for a direct current component and a second Huffman table H2 for an alternating current component, so that the quantized DCT coefficients of the Y data are converted to encoded data.

In the same way as the above, the Cb data and the Cr data are converted to DCT coefficients in the DCT processing unit 12, and are then quantized in a second quantization processing unit 14, using a second quantiztion table Q2, and converted to quantized DCT coefficients. The quantized DCT coefficients of the Cb and Cr data are Huffman-encoded in a second Huffman encoding processing unit 15, using a third Huffman table H3 for a direct current component and a fourth Huffman table H4 for an alternating current component, so that the quantized DCT coefficients of the Cb and Cr data are converted to encoded data.

The encoded data (i.e., JPEG data) of the Y, Cb and Cr data are outputted from the image compressing device as compressed image data, and are recorded in a recording medium such as an IC memory card.

As a non-limiting example, and in accordance with the present invention, the image processing device 20 may comprise a personal computer, such as an IBM-compatible computer with a Pentium or Pentium Pro central processor running at 200 MHZ, at least 16 MB of random access memory (RAM), at least 1 GB of hard-disk storage capacity, and a commercially available SVGA monitor. The DCT processing unit 11, first quantization processing unit 12, second quantization processing unit 14, first Huffman encoding processing unit 13, and second Huffman encoding processing unit 15, may be implemented by a high-level software program written in C++, or any other object oriented programming language. In addition, quantization tables Q1 and Q2, and Huffman tables H1–H4 may be stored in the random access memory (RAM) or the hard-disk for retrieval by the software.

In the DCT processing unit 11, the first and second quantization processing units 12 and 14, and the first and second Huffman encoding processing units 13 and 15, the Y, Cb, and Cr data, regarding a single frame image, are divided into a plurality of blocks, which are processed separately. Note that each of the blocks is composed of pixel data arranged in an 8×8 matrix.

Although the first quantization table Q1, by which the DCT coefficients of the Y data are quantized, and the second quantization table Q2, by which the DCT coefficients of the Cb and Cr data are quantized, are different from each other according to the JPEG algorithm, a single quantization table can be used for each of the data.

FIG. 2 shows, as an example, pixel values Pyx of an 8×8 pixel block, DCT coefficients Fvu, quantized DC coefficients Rvu, and a quantization table QVU. The suffix "y" represents the vertical position of the 8×8 pixel block. Values of "y" (0, 1, 2, . . . 7) range from the upper-position to the lower-position. The suffix "x" represents the horizontal position of the 8×8 pixel block. Values of "x" (0, 1, 2, . . . 7) range from the left-position to the right-position. The suffixes "v" and "u" correspond to the vertical and horizontal positions of 64 DCT coefficients which are arranged in an 8×8 matrix. Values of "v" (0, 1, 2, . . . 7) range from the upper-position to the lower-position. Values of "u" (0, 1, 2, . . . 7) range from the left-position to the right-position.

The pixel values Pyx are converted to 64 (8×8) DCT coefficients Fvu by the two-dimensional DCT. The two-dimensional DCT is expressed by the following equation (1):

$$Fvu = \frac{1}{4} Cu\, Cv \sum_{y=0}^{7} \sum_{x=0}^{7} Pyx \cdot \cos\frac{(2x+1)u\Pi}{16} \cdot \cos\frac{(2y+1)v\Pi}{16} \quad (1)$$

$$\text{wherein } Cu, Cv = \frac{1}{\sqrt{2}} : u, v = 0$$

$$= 1 : u, v \neq 0$$

Of these DCT coefficients, the DCT coefficient $F_{00}$ at the position (0,0) is the DC (Direct Current) component, while the remaining 63 DC coefficients Fvu are the AC (Alternating Current) components. The AC components show how many higher spatial frequency components there are in the 8×8 pixel block of image data from the coefficients $F_{01}$ and $F_{10}$ to the coefficient $F_{77}$. The DC component shows the average value of the spatial frequency components of the 8×8 pixel block as a whole. Each DCT coefficient Fvu corresponds to a predetermined spatial frequency.

The quantization table Q1 shown in FIG. 2 is one example used in the quantization processing unit 12. The quantization table Q1 is composed of 64 quantization coefficients Qvu. The equation for quantization of the DCT coefficients Fvu using the quantization table Q1 is defined as follows:

$$Rvu = \text{round}\,(Fvu/Qvu)(0 \leq u, v \leq 7)$$

The term "round" in this equation is an approximation function, which approximates, to the nearest integer, the value of the argument. Thus, if the argument is less than 0.5, the value is rounded down to the nearest integer. If the argument is greater than or equal to 0.5, the value is rounded up to the nearest integer. For example, the value 3.49 is rounded to 3, whereas 3.50 is rounded to 4. Namely, the quantized DCT coefficients Rvu shown in FIG. 2 are obtained by dividing each of the DCT coefficients Fvu by the quantization coefficients Qvu, and rounding off.

The quantized DCT coefficients Rvu, obtained in the quantization processing unit 12 in this way, are inputted to the Huffman encoding processing unit 13. Since the Huffman encoding performed in the Huffman encoding processing unit 13 is well known, a detailed explanation thereof is omitted in this specification.

Figure 3:
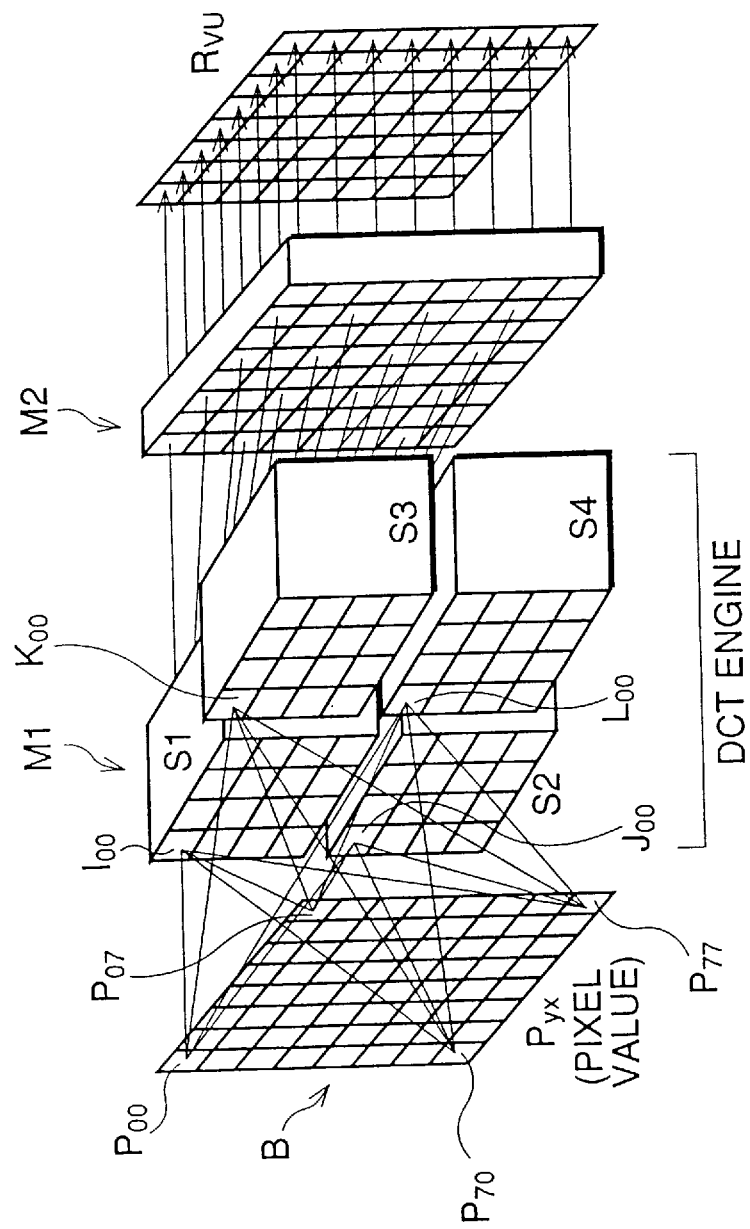
FIG. 3 is a view schematically showing a construction of an image processing device included in the image compression device shown in FIG. 1.

FIG. 3 schematically shows a schematic of an image processing device included in the image compression device of FIG. 1, and FIG. 4 shows cosine values corresponding to spatial coordinates and spatial frequency parameters.

In FIG. 3, each of the 64 pixel values Pyx, of which the 8×8 pixel block is composed, is inputted to one of first through fourth stages S1, S2, S3, or S4, so that each of the 64 pixel values Pyx is subjected to part of the two-dimensional DCT. The first through fourth stages S1, S2, S3, and S4 form a pre-processing unit (DCT engine) M1. Data obtained by this part of the two-dimensional DCT is referred to as a pre-processed DCT coefficient hereinafter. In each of the stages S1 through S4, 16 pre-processed DCT coefficients are obtained. Namely, 64 pre-processed DCT coefficients are obtained in the pre-processing unit M1.

The 64 pre-processed DCT coefficients are inputted into one of 64 post-process calculation units which form a post-processing unit M2. The post-processing unit M2 performs the remaining part of the two-dimensional DCT, which has not been carried out in the pre-processing unit M1, as well as the quantization, and is provided with a multiplying term and quantization table. The table is formed by combining the remaining part of the two-dimensional DCT and the quantization coefficients. Namely, the pre-processed DCT coefficients are subjected to calculation processes in accordance with the multiplying term and quantization table in the post-processing unit M2, so that quantization DCT coefficients Rvu are obtained.

The contents of the processes in the first through fourth stages S1 through S4 of the pre-processing unit M1 will be described below.

Two cosine functions in equation (1) are combined in a spatial frequency f(u,v) as described herein. FIG. 4 shows a 2-dimensional array containing cosine values evaluated for each of the eight spatial coordinates "x" (or "y") and in each of the eight spatial frequency parameters "u" (or "v"). The spatial coordinate "x" corresponds to the spatial frequency parameter "u", and the spatial coordinate "y" corresponds to the spatial frequency parameter "v". Cosine values are written as $c[i]$ where:

$$c[i] = \cos(i\Pi/16)$$

In FIG. 4, for u=0, c[4] is shown instead of c[0], since, in a one-dimensional DCT, $$Cu = 1/\sqrt{2} = \cos(4\Pi/16) = c[4]$$

Thus, the table shown in FIG. 4 includes Cu and Cv.

As can be understood from FIG. 4, the absolute values of the cosine values are equal for x=0 and x=7, x=1 and x=6, x=2 and x=5, and x=3 and x=4, respectively. In other words, the arrangement of the absolute values is symmetric with regard to the left and right halves about the vertical line C0 which is located between x=3 and x=4. By taking advantage of the symmetry, the number of multiplications in the two-dimensional DCT is minimized, and this process will be described later in detail.

Two cosine values by which each of the pixel values is multiplied when the DCT coefficients Fvu are calculated, are called "cosine coefficient" in this specification. The cosine coefficient can be obtained using FIG. 4. As an example, the cosine coefficients of F42 (v=4 and u=2) and F31 (v=3 and u=1) are shown in FIGS. 5 and 6, respectively. Note that, in FIGS. 5 and 6, $$c[i,j] = \cos(i\Pi/16)\cdot\cos(j\Pi/16)$$

The cosine coefficients of F42 in FIG. 5 are obtained in the following way. First, the cosine values of the row indicated by the reference marker V1 in FIG. 4 are used to fill the vertical axis indicated by the reference marker V1 on the left side of the table in FIG. 5. Next, the cosine values of the row indicated by the reference marker U1 in FIG. 4 are used to fill the horizontal axis indicated by the reference marker U1 in the upper portion of the table. The table is completed by multiplying the corresponding cosine values of each row and column. The cosine coefficients of F31 shown in FIG. 6 are obtained in a similar way. The cosine values of the column indicated by the reference marker V2 and the cosine values of the row indicated by the reference U2 are filled with their corresponding values from FIG. 4. The sum of the products of these cosine coefficients and the pixel values Pyx is obtained, and is multiplied by ¼ (i.e., equation (1) is calculated), so that the cosine coefficients F42 and F31 are obtained.

As can be understood from FIGS. 5 and 6, the arrangement of the cosine coefficients is symmmetric about the vertical center line C1 passing between x=3 and x=4, and is symmetric about the horizontal center line C2 passing between y=3 and y=4. For example, the absolute values of the cosine coefficients of four pixels with the following coordinates in the table: (0,0), (7,0), (0,7), (7,7) are equal. All of the Fvu values have the symmetric arrangement described above. Therefore, if four such pixels are processed simultaneously, the two-dimensional DCT is carried out with a high efficiency. Note that four such pixels are referred to as a "four-pixel group" in this specification. Namely, the four-pixel group is defined as: when the original image data is composed of pixel values arranged in an "n"×"n" matrix, the four-pixel group has pixel values which are symmetrically arranged and are multiplied by cosine coefficients having the same absolute values.

Figure 7:
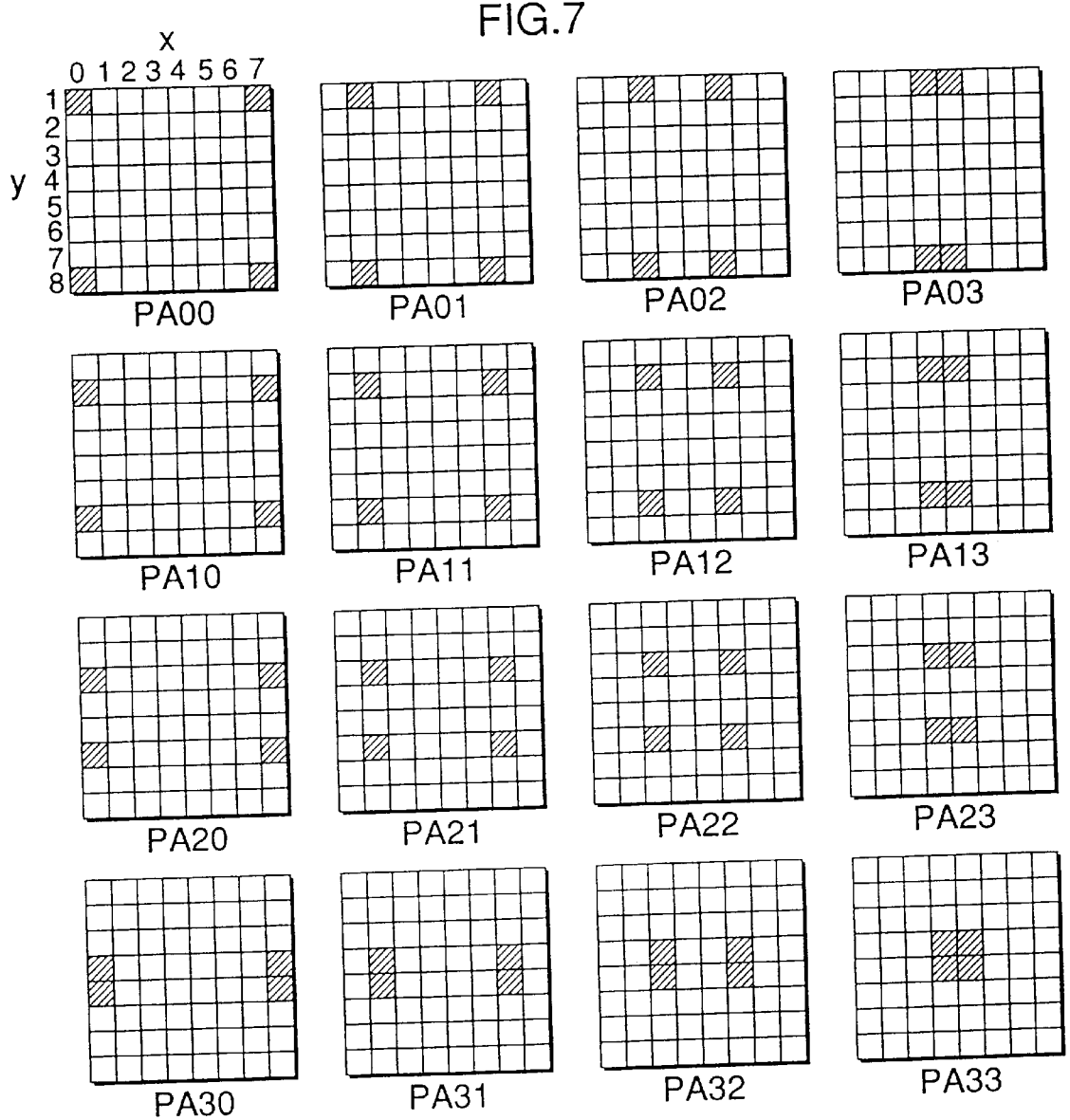
FIG. 7 is a view showing four-pixel groups.

FIG. 7 shows the locations of the four-pixel groups. The following table explains the composition of the four-pixel groups:

| Pixel Group | Pixels |
| --- | --- |
| PA00 | $P_{00}, P_{07}, P_{70}, P_{77}$ |
| PA01 | $P_{01}, P_{06}, P_{71}, P_{76}$ |
| PA02 | $P_{02}, P_{05}, P_{72}, P_{75}$ |
| PA03 | $P_{03}, P_{04}, P_{73}, P_{74}$ |
| PA10 | $P_{10}, P_{17}, P_{60}, P_{67}$ |
| PA11 | $P_{11}, P_{16}, P_{61}, P_{66}$ |
| PA12 | $P_{12}, P_{15}, P_{62}, P_{65}$ |
| PA13 | $P_{13}, P_{14}, P_{63}, P_{64}$ |
| PA20 | $P_{20}, P_{27}, P_{50}, P_{57}$ |
| PA21 | $P_{21}, P_{26}, P_{51}, P_{56}$ |
| PA22 | $P_{22}, P_{25}, P_{52}, P_{55}$ |
| PA23 | $P_{23}, P_{24}, P_{53}, P_{54}$ |
| PA30 | $P_{30}, P_{37}, P_{40}, P_{47}$ |
| PA31 | $P_{31}, P_{36}, P_{41}, P_{46}$ |
| PA32 | $P_{32}, P_{35}, P_{42}, P_{45}$ |
| PA33 | $P_{33}, P_{34}, P_{43}, P_{44}$ |

The symbol patterns associated with the four-pixel groups are described below. As in the example F31 shown in FIG.

6, the cosine coefficients corresponding to the first pixel group PA00, (x,y)={(0,0), (0,7), (7,0), (7,7)} have the symbol pattern {+,−,−,+}. Similarly, the cosine coefficients corresponding to the other pixel groups, have a symbol pattern of {+,−,−,+} or {,−,+,+,−}, which are reversed, but are the same pattern. Thus, the DCT coefficients of one spatial frequency f (u,v) inevitably correspond to the same symbol pattern.

Figure 8:
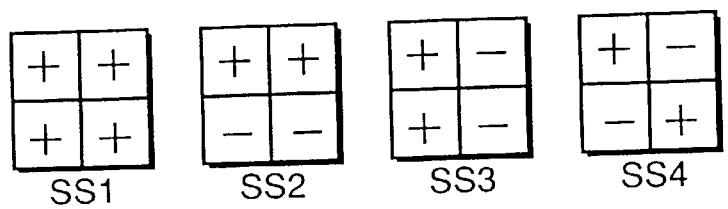
FIG. 8 is a view showing symbol patterns in the form of a 2×2 matrix.

FIG. 8 shows the symbol pattern in a 2×2 matrix. Namely, a first symbol pattern SS1 is {+,+,+,+}, a second symbol pattern SS2 is {+,+,−,−}, a third symbol pattern SS3 is {+,−,+,−}, and a fourth symbol pattern SS4 is {+,−,−,+}. The first through fourth symbol patterns SS1, SS2, SS3, and SS4 are used in the first through fourth stages S1, S2, S3, and S4 in the pre-processing unit M1, respectively.

As shown in FIG. 9, the first stage S1 has addition and subtraction units I00, I01, . . . and I33, the second stage S2 has addition and subtraction units J00, J00, . . . and J33, the third stage S3 has addition and subtraction units K00, K01, . . . and K33, and the fourth stage S4 has addition and subtraction units L00, L0, . . . and L33.

In each of the addition and subtraction units of the first stage S1, additions and subtractions are performed according to the first symbol pattern SS1. For example, each of the pixel values belonging to the first pixel group PA00 is calculated as P00+P07+P70+P77 in the addition and subtraction unit I00. In each of the addition and subtraction units of the second stage S2, additions and subtractions are performed according to the second symbol pattern SS2. For example, each of the pixel values belonging to the first pixel group PA00 is calculated as P00+P07−P70−P77 in the addition and subtraction unit J00. In each of the addition and subtraction units of the third stage S3, additions and subtractions are performed according to the third symbol pattern SS3. For example, each of the pixel values belonging to the first pixel group PA00 is calculated as P00−P07+P70−P77 in the addition and subtraction unit K00. In each of the addition and subtraction units of the fourth stage S4, additions and subtractions are performed according to the fourth symbol pattern SS4. For example, each of the pixel values belonging to the first pixel group PA00 is calculated as P00−P07−P70+P77 in the addition and subtraction unit L00.

As shown in FIG. 3, the 64 pixel values Pyx of block B are classified according to the four-pixel groups, and are inputted into predetermined addition and subtraction units included in each of the stages S1, S2, S3, and S4. For example, the pixel values of the first pixel group PA00 are inputted into the addition and subtraction units I00, J00, K00, and L00, as described above. In each of the stages S1 through S4, the addition and subtraction values outputted from each of the addition and subtraction units are multiplied by the pre-processing cosine coefficients corresponding to the predetermined cosine coefficients.

Although, as described later, the pre-processing cosine coefficients are obtained by dividing a cosine coefficient, which should be multiplied by the addition and subtraction value in the two-dimensional DCT, by a predetermined coefficient so that the number of multiplications is reduced, to simplify the explanation, suppose that the addition and subtraction values are not multiplied by the pre-processing cosine coefficients, but are instead multiplied by cosine coefficients in each of the stages S1 through S4. Namely, in the description below, the four pixel values forming one four-pixel group are multiplied by a common cosine coefficient, and thus, 16 DCT coefficients are obtained in each of the stages S1 through S4, respectively.

FIG. 10 shows the relationship between each of the stages S1 though S4 of the pre-processing unit M1 and the spatial frequencies f(u,v) calculated in these stages S1 through S4. As shown in this drawing, each of the parameters "u" and "v" is 0, 4, 2, or 6 in the first stage S1. In the second stage S2, the parameter "u" is 0, 4, 2, or 6 and the parameter "v" is 1, 3, 5, or 7. In the third stage S3, the parameter "u" is 1, 3, 5, or 7 and the parameter "v" is 0, 4, 2, or 6. In the fourth stage S4, each of the parameters "u" and "v" is 1, 3, 5, or 7. For example, the DCT coefficient F42 (v=4 and u=2) is obtained in the first stage S1, and the DCT coefficient F31 (v=3, u=1) is obtained in the fourth stage S4.

The first stage S1 is divided into three areas A1, A2, and A3. In the first area A1, the parameters "u" and "v" are 0 or 4. In the second area A2, either the parameter "u" is 2 or 6 and the parameter "v" is 0 or 4, or the parameter "u" is 0 or 4 and the parameter "v" is 2 or 6. In the third area A3, the parameters "u" and "v" are 2 or 6. The second stage S2 is divided into two areas A4 and A5. In the fourth area A4, the parameter "u" is 0 or 4 and the parameter "v" is 1, 3, 5, or 7. In the fifth area A5, the parameter "u" is 2 or 6 and the parameter "v" is 1, 3, 5, or 7. The third stage S3 is also divided into two areas A4 and A5. In the fourth area A4, the parameter "u" is 1, 3, 5, or 7 and the parameter "v" is 0 or 4. In the fifth area A5, the parameter "u" is 1, 3, 5, or 7 and the parameter "v" is 2 or 6. The fourth stage S4 has only one area A6, in which each of the parameters "u" and "v" is 1, 3, 5, or 7, and is not divided as in the stages S1 through S3.

As shown in FIG. 11, in the first area A1, a first process corresponding to a multiplication in which each of the pixel values Pyx is multiplied by $\cos(4\Pi/16)\cdot\cos(4\Pi/16)$, is performed. Namely, the 16 addition and subtraction values outputted by the addition and subtraction units I00 through I33 are multiplied by $\cos(4\Pi/16)\cdot\cos(4\Pi/16)$, so that four DCT coefficients F00, F04, F40 and F44 are obtained.

In the second area A2, a second process corresponding to a multiplication in which each of the pixel values Pyx is multiplied by either $\cos(4\Pi/16)\cdot\cos(2\Pi/16)$ or $\cos(4\Pi/16)\cdot\cos(6\Pi/16)$, is performed. Namely, the 16 addition and subtraction values outputted by the addition and subtraction units I00 through I33 are multiplied by either $\cos(4\Pi/16)\cdot\cos(2\Pi/16)$ or $\cos(4\Pi/16)\cdot\cos(6\Pi/16)$, so that eight DCT coefficients F02, F06, F42, F46, F20, F24, F60, and F64 are obtained.

In the third area A3, a third process corresponding to a multiplication in which each of the pixel values Pyx is multiplied by either $\cos(2\Pi/16)\cdot\cos(2\Pi/16)$, $\cos(2\Pi/16)\cdot\cos(6\Pi/16)$ or $\cos(6\Pi/16)\cdot\cos(6\Pi/16)$, is performed. Namely, the 16 addition and subtraction values outputted by the addition and subtraction units I00 through I33 are multiplied by one of these cosine coefficients, so that four DCT coefficients F22, F26, F62, F66 are obtained.

In the fourth area A4, a fourth process corresponding to a multiplication in which each of the pixel values Pyx is multiplied by either $\cos(4\Pi/16)\cdot\cos(\Pi/16)$, $\cos(4\Pi/16)\cdot\cos(3\Pi/16)$, $\cos(4\Pi/16)\cdot\cos(5\Pi/16)$, or $\cos(4\Pi/16)\cdot\cos(7\Pi/16)$, is performed. In the fourth area A4 of the second stage S2, the 16 addition and subtraction values outputted by the addition and subtraction units J00 through J33 are multiplied by one of the cosine coefficients, so that eight DCT coefficients F10, F14, F30, F34, F50, F54, F70, and F74 are obtained. In the fourth area A4 of the third stage S3, the 16 addition and subtraction values outputted by the addition and subtraction units K00 through K33 are multiplied by one of the cosine coefficients, so that eight DCT coefficients F0, F03, F05, F07, F41, F43, F45, and F47 are obtained.

In the fifth area A5, a fifth process corresponding to a multiplication in which each of the pixel values Pyx is multiplied by one of the following: $\cos(2\Pi/16)\cdot\cos(\Pi/16)$, cos(2Π/16)·cos(3Π/16), cos(2Π/16)·cos(5Π/16), cos(2Π/16)·cos(7Π/16), cos(6Π/16)·cos(Π/16), cos(6Π/16)·cos(3Π/16), cos(6Π/16)·cos(5Π/16), or cos(6Π/16)·cos(7Π/16), is performed. In the fifth area A5 of the second stage S2, the 16 addition and subtraction values outputted by the addition and subtraction units J00 through J33 are multiplied by one of the cosine coefficients, so that eight DCT coefficients F12, F16, F32, F36, F52, F56, F72 and F76 are obtained. In the fifth area A5 of the third stage S3, the 16 addition and subtraction values outputted by the addition and subtraction units K00 through K33 are multiplied by one of the cosine coefficients, so that eight DCT coefficients F21, F23, F25, F27, F61, F63, F65, and F67 are obtained.

In the sixth area A6, a sixth process corresponding to a multiplication in which each of the pixel values Pyx is multiplied by one of the following: cos(Π/16)·cos(Π/16), cos(Π/16)·cos(3Π/16), cos(Π/16)·cos(5Π/16), cos(Π/16)·cos(7Π/16), cos(3Π/16)·cos(3Π/16), cos(3Π/16)·cos(5Π/16), cos(3Π/16)·cos(7Π/16), cos(5Π/16)·cos(5Π/16), cos(5Π/16)·cos(7Π/16), or cos(7Π/16)·cos(7Π/16), is performed. Namely, the 16 addition and subtraction values outputted by the addition and subtraction units L00 through L33 are multiplied by one of the cosine coefficients, so that 16 DCT coefficients F11, F13, F15, F17, F31, F33, F35, F37, F51, F53,. F55, F57, F71, F73, F75, F77 are obtained.

As described above, in the processes in the first area A1, the cosine coefficient by which the pixel values Pyx are multiplied is only cos(4Π/16)·cos(4Π/16). Although there may be only one multiplication, since the value of the cosine coefficient is ½, the calculation is actually carried out in a computer according to a shift calculation. Namely, the number of multiplications in the first area A1 is reduced to zero.

In the processes of the third area A3, there are three cosine coefficients by which the pixel values Pyx are multiplied. Since $c[6,6]$ can be converted to $1-c[2,2]$, one of the multiplications involving $c[6,6]$ and $c[2,2]$ is actually replaced by the other multiplication. Therefore, the number of multiplications in the third area A3 is reduced to two.

In the processes of the sixth area A6, there are ten cosine coefficients by which the pixel values Pyx are multiplied. Since $c[5,5]$ can be converted to $1-c[3,3]$ and $c[7,7]$ can be converted to $1-c[1,1]$, two multiplications are actually omitted. Therefore, the number of multiplications in the sixth area A6 is reduced to eight.

According to the reductions described above, the number of multiplications necessary in the two-dimensional DCT is $$(2\times 8)+(2\times 4)+(4\times 16)+(8\times 16)+(8\times 16)=344 \qquad (2)$$

The description up to this point has been related to a case in which the cosine coefficients are multiplied, i.e., a case in which 16 DCT coefficients are obtained in each of the stages S1 through S4. In the embodiment however, using the multiplying term and quantization table, the number of multiplications shown by equation (2) is reduced, as described below.

FIG. 12 shows the multiplying terms in the spatial frequencies f(u,v). In this drawing, "x¼" located in the upper left portion of the table represents that the coefficient ¼ is included in equation (1), and unit that each of the multiplying terms is multiplied by ¼.

The method used to obtain the multiplying terms shown in FIG. 12 is described below, using the case of the DCT coefficient F42. With reference to FIG. 5, many values of $c[4,2]$ (i.e., $c[2,4]$) are included as the cosine coefficients of the DCT coefficients F42. Thus, if all of the cosine coefficients shown in FIG. 5 are divided by $c[4,2]$, these become either 1, $(2^{1/2}-1)$, or $(2^{1/2}+1)$. Therefore, when obtaining the DCT coefficients F42, in the first stage S1 of the pre-processing unit M1, the cosine coefficients shown in FIG. 5 are not multiplied, but either 1, $(2^{1/2}-1)$, or $(2^{1/2}+1)$ is multiplied. To explain in more detail, when $(2^{1/2}-1)$ is multiplied for example, the sum of the pixel values Pyx is subtracted from the value obtained by multiplying the sum of the pixel values Pyx and $2^{1/2}$. Then, $c[4,2]$ is multiplied in the post-processing unit M2. In this way, the number of multiplications carried out, in order to obtain the DCT coefficients F42 in the second area A2 of the first stage S1, is reduced from two to one.

Thus, in the pre-processing unit M1, the cosine coefficients shown by the equation (1) are not used, but coefficients are obtained by dividing the cosine coefficients by the multiplying terms shown in FIG. 12. The 64 pre-processing DCT coefficients obtained in this way are inputted to the post-processing unit M2, and are subjected to the remaining part of the two-dimensional DCT and the quantization.

The contents of the post-processing unit M2 are described below.

In the post-processing unit M2, the pre-processed DCT coefficients outputted by the pre-processing unit M1 are multiplied by components of the multiplying term and quantization table, as described below. In the JPEG, with regard to luminance for example, the quantization table shown in FIG. 13 is recommended. To perform the remaining part of the two-dimensional DCT and the quantization for the pre-processed DCT coefficients simultaneously, post-process coefficients which are obtained by multiplying the multiplying terms shown in FIG. 12 and the reciprocal numbers of the quantization coefficients shown in FIG. 13, are multiplied by the pre-processed DCT coefficients. FIG. 14 shows the multiplying term and quantization table obtained this way. Note that $10^{-3}$ located in the upper left corner represents that each of the post-process coefficients is multiplied by $10^{-3}$.

Namely, the pre-processed DCT coefficients are multiplied by the post-process coefficient, or by the multiplying term and quantization table in the post-processing unit M2, so that the quantization DCT coefficients Rvu are obtained.

The number of multiplications in the two-dimensional DCT performed as described above is 6 in the first stage S1 of the pre-processing unit M1, 24 in the second stage S2, 24 in the third stage S3, 20 in the fourth stage S4, and 64 in the post-processing unit M2. Namely, the total number of multiplications is 138. If the method proposed in "High Speed Calculation Algorithm of Orthogonal Transformation" (Digital Signal Process Handbook, Ohm Company Limited, issued in 1993), which is applied to the one-dimensional DCT, is carried out twice, the method can be applied to the two-dimensional DCT. In this case, the number of multiplications is 240. Conversely, according to the embodiment of the present invention, the number of multiplications can be reduced by 102, so that the calculation speed is raised by approximately 74%. Throughout the instant specification and claims various relationships (equations) are set forth. Some of these relationships utilize the symbol "■". This symbol represents a multiplication operation.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-199112 (filed on Jul. 12, 1995) which is expressly incorporated herein by reference, in its entirety.

I claim:

1. An image processing device, in which inputted original image data, composed of pixel values, are arranged in a matrix, said pixel values being subjected to a two dimensional discrete cosine transformation (DCT) to obtain a DCT coefficient for each of spatial frequencies, and said DCT coefficient being quantized by a quantization coefficient included in a quantization table to obtain a quantized DCT coefficient, said device comprising:

pre-process unit for obtaining pre-processed DCT coefficients corresponding to said pixel values, said pre-process unit being divided into a plurality of stages in accordance with cosine coefficients of said two dimensional DCT, said pre-processed DCT coefficients being obtained by applying a calculation, which corresponds to said cosine coefficients, to said pixel values in each of said stages;

classifying unit for classifying said pixel values into groups composed of a predetermined number of pixel values, said groups are disposed in said matrix arrangement symmetrically about an axis, and said groups are multiplied by cosine coefficients having the same absolute value;

pixel value input unit for inputting said pixel values of each of said groups into said plurality of stages, respectively; and post-process unit for performing a post-process in which each of said pre-processed DCT coefficients a multiplied by a corresponding post-process coefficient to obtain said quantized DCT coefficient, said post-process coefficient being generated based on combination of said quantization coefficient and one of a plurality of multiplying terms corresponding to said cosine coefficients.

2. A device according to claim 1, wherein said DCT coefficient is $$Fvu = \frac{1}{4} Cu\, Cv \sum_{y=0}^{7} \sum_{x=0}^{7} Pyx * \cos\frac{(2x+1)u\Pi}{16} * \cos\frac{(2y+1)v\Pi}{16}$$

$$\text{wherein } Cu, Cv = \frac{1}{\sqrt{2}} : u, v = 0$$

$$= 1 : u, v \neq 0$$

wherein said inputted original image data includes pixel values Pyx of an 8×8 pixel block, wherein the suffix "y" represents the vertical position within the 8×8 pixel block, and the suffix "x" represents the horizontal position within the 8×8 pixel block, a vertical position within an 8×8 matrix in which 64 DCT coefficients are arranged is indicated by a parameter "v" and a horizontal position within said 8×8 matrix is indicated by a parameter "u", and further wherein Cu and Cv=½ when u and v=0, and Cu and Cv=1 when u and v≠0;

said pre-process unit comprising a first stage in which each of the parameters "u" and "v" is 0, 4, 2, or 6, a second stage in which said parameter "u" is 0, 4, 2, or 6 and said parameter "v" is 1, 3, 5, or 7, a third stage in which said parameter "u" is 1, 3, 5, or 7 and said parameter "v" is 0, 4, 2, or 6, and a fourth stage in which each of said parameters "u" and "v" is 1, 3, 5, or 7.

3. A device according to claim 2, wherein said first stage comprises a first area in which each of said parameters "u" and "v" is 0 or 4, a second area in which said parameter "u" is 2 or 6 and said parameter "v" is 0 or 4, or said parameter "u" is 0 or 4 and said parameter "v" is 2 or 6, and a third area in which each of said parameters "u" and "v" is 2 or 6.

4. A device according to claim 3, wherein said first area performs a first process corresponding to a multiplication in which each of said pixel values Pyx is multiplied by cos(4Π/16)■cos(4Π/16).

5. A device according to claim 3, wherein said second area performs a second process corresponding to a multiplication in which each of said pixel values Pyx is multiplied by cos(4Π/16)■cos(2Π/16) or cos(4Π/16)■cos(6Π/16).

6. A device according to claim 3, wherein said third area performs a third process corresponding to a multiplication in which each of said pixel values Pyx is multiplied by cos(2Π/16)■cos(2Π/16), cos(2Π/16)■cos(6Π/16), or cos(6Π/16)■cos(6Π/16).

7. A device according to claim 2, wherein said second stage comprises a fourth area in which said parameter "u" is 0 or 4 and said parameter "v" is 1, 3, 5, or 7, a fifth area in which said parameter "u" is 2 or 6 and said parameter "v" is 1, 3, 5, or 7.

8. A device according to claim 2, wherein said third stage comprises a fourth area in which said parameter "u" is 1, 3, 5, or 7 and said parameter "v" is 0 or 4, a fifth area in which said parameter "u" is 1, 3, 5, or 7 and said parameter "v" is 2 or 6.

9. A device according to claim 7, wherein said fourth area performs a fourth process corresponding to a multiplication in which each of said pixel values Pyx is multiplied by cos(4Π/16)■cos(Π/16), cos(4Π/16)■cos(3Π/16), cos(4Π/16)■cos(5Π/16), or cos(4Π/16)■cos(7Π/16).

10. A device according to claim 7, wherein said fifth area performs a fifth process corresponding to a multiplication in which each of said pixel values Pyx is multiplied by cos(2Π/16)■cos(Π/16), cos(2Π/16)■cos(3Π/16), cos(2Π/16)■cos(5Π/16), cos(2Π/16)■cos(7Π/16), cos(6Π/16)■cos(Π/16), cos(6Π/16)■cos(3Π/16), cos(6Π/16)■cos(5Ir/16), or cos(6Π/16)■cos(7Π/16).

11. A device according to claim 2, wherein said fourth stage comprises a sixth area in which each of said parameters "u" and "v" is 1, 3, 5, or 7.

12. A device according to claim 11, wherein said sixth area performs a sixth process corresponding to a multiplication in which each of said pixel values Pyx is multiplied by cos(Π/16)■cos(Π/16), cos(Π/16)■cos(3Π/16), cos(Π/16)■cos(5Π/16), cos(Π/16)■cos(7Π/16), cos(3Π/16)■cos(3Π/16), cos(3Π/16)■cos(5Π/16), cos(3Π/16)■ cos(7Π/16), cos(5Π/16)■ cos(5Π/16), cos(5Π/16)■ cos(7Π/16), or cos(7Π/16)■ cos(7Π/16).

13. A device according to claim 1, wherein a number of said pixel values included in each of said groups is four.

14. A device according to claim 13, said inputted original image data is pixel values Pyx of an 8×8 pixel block, wherein the suffix "y" represents the vertical position of the 8×8 pixel block, and suffix "x" represents the horizontal position of the 8×8 pixel block, and said classifying unit classifies said pixel values into a first pixel group composed of $P_{00}$, $P_{07}$, $P_{70}$, $P_{77}$, a second pixel group composed of $P_{01}$, $P_{06}$, $P_{71}$, $P_{76}$, a third pixel group composed of $P_{02}$, $P_{05}$, $P_{72}$, $P_{75}$, a fourth pixel group composed of $P_{03}$, $P_{04}$, $P_{73}$, $P_{74}$, a fifth pixel group composed of $P_{10}$, $P_{17}$, $P_{60}$, $P_{67}$, a sixth pixel group composed of $P_{11}$, $P_{16}$, $P_{61}$, $P_{66}$, a seventh pixel group composed of $P_{12}$, $P_{15}$, $P_{62}$, $P_{65}$, an eighth pixel group composed of $P_{13}$, $P_{14}$, $P_{63}$, $P_{64}$, a ninth pixel group composed of $P_{20}$, $P_{27}$, $P_{50}$, $P_{57}$, a tenth pixel group composed of $P_{21}$, $P_{26}$, $P_{51}$, $P_{56}$, an eleventh pixel group composed of $P_{22}$, $P_{25}$, $P_{52}$, $P_{55}$, a twelfth pixel group composed of $P_{23}$, $P_{24}$, $P_{53}$, $P_{54}$, a thirteenth pixel group composed $P_{30}$, $P_{37}$, $P_{40}$, $P_{47}$, a fourteenth pixel group composed of $P_{31}$, $P_{36}$, $P_{41}$, $P_{46}$, a fifteenth pixel group composed of $P_{32}$, $P_{35}$, $P_{42}$, $P_{45}$, and a sixteenth pixel group composed of $P_{33}$, $P_{34}$, $P_{43}$, $P_{44}$.

15. A device according to claim 1, wherein said post-process coefficient is obtained by multiplying said one of said plurality of multiplying terms and an inverse value of said quantization coefficient.

16. An image processing device applying a two-dimensional discrete cosine transformation (DCT) to original image data to obtain DCT coefficients, and then applying a quantization coefficient to each of said DCT coefficients to obtain quantized DCT coefficients, said device comprising:

unit for generating pixel groups in accordance with pixel values which form said original image data and are arranged in a matrix, each of said pixel groups being composed of a predetermined number of said pixel values which are symmetrically disposed in said matrix arrangement;

unit for applying a pre-process to said pixel values to obtain pre-processed DCT coefficients corresponding to said pixel values, said pre-process unit being divided into a plurality of stages in accordance with cosine coefficients used in said two dimensional DCT, said pre-processed DCT coefficients being obtained by applying a calculation corresponding to said cosine coefficients to said pixel values in each of said stages;

unit for inputting said pixel values of each of said groups into said plurality of stages, respectively; and unit for applying a post-process in which each of said pre-processed DCT coefficients is multiplied by a corresponding post-process coefficient to obtain said quantized DCT coefficient, said post-process coefficient being generated based on combination of said quantization coefficient and one of a plurality of multiplying terms corresponding to said cosine coefficients.

17. A device according to claim 8, wherein said fourth area performs a fourth process corresponding to a multiplication in which each of said pixel values Pyx is multiplied by $\cos(4\Pi/16)\blacksquare \cos(\Pi/16)$, $\cos(4\Pi/16)\blacksquare \cos(3\Pi/16)$, $\cos(4\Pi/16)\blacksquare \cos(5\Pi/16)$, or $\cos(4\Pi/16)\blacksquare \cos(7\Pi/16)$.

18. A device according to claim 8, wherein said fifth area performs a fifth process corresponding to a multiplication in which each of said pixel values Pyx is multiplied by $\cos(2\Pi/16)\blacksquare \cos(\Pi/16)$, $\cos(2\Pi/16)\blacksquare \cos(3\Pi/16)$, $\cos(2\Pi/16)\blacksquare \cos(5\Pi/16)$, $\cos(2\Pi/16)\blacksquare \cos(7\Pi/16)$, $\cos(6\Pi/16)\blacksquare \cos(\Pi/16)$, $\cos(6\Pi/16)\blacksquare \cos(3\Pi/16)$, $\cos(6\Pi/16)\blacksquare \cos(5\Pi/16)$, or $\cos(6\Pi/16)\blacksquare \cos(7\Pi/16)$.

* * * * *

UNITED STATES PATENT AND TRADEMARK OFFICE
CERTIFICATE OF CORRECTION

PATENT NO. : 5,886,790
DATED : March 23, 1999
INVENTOR(S) : N. ABe, et. al.

It is certified that error appears in the above-identified patent and that said Letters Patent is hereby corrected as shown below:

At column 11, line 28 (claim 1, line 27) of the printed patent, "a" should be —is—.

At column 11, line 31, (claim 1, line 30) of the printed patent, insert — a — after "on".

At column 12, line 35 (claim 10, line 6) of the printed patent, "51r/16" should be —5$\overline{11}$/16—.

At column 12, line 57 (claim 14, line 8) of the printed patent, "po5" should be — $P_{o5}$ —.

At column 11, line 10 (claim 1, line 9) of the printed patent, "unit" should be —means—.

At column 11, line 12 (claim 1, line 11) of the printed patent, "unit" should be —means—.

At column 11, line 18 (claim 1, line 17) of the printed patent, "unit" should be —means—.

At column 11, line 24 (claim 1, line 23) of the printed patent, "unit" should be —means—.

At column 11, line 27 (claim 1, line 26) of the printed patent, "unit" should be —means—.

UNITED STATES PATENT AND TRADEMARK OFFICE
CERTIFICATE OF CORRECTION

PATENT NO. : 5,886,790
DATED : March 23, 1999
INVENTOR(S) : N. Abe, et. al.

It is certified that error appears in the above-identified patent and that said Letters Patent is hereby corrected as shown below:

At column 11, line 56 (claim 2, line 16) of the printed patent, "unit" should be —means—.

At column 12, line 54 (claim 14, line 5) of the printed patent, "unit" should be —means—.

At column 13, line 12 (claim 16, line 6) of the printed patent, "unit" should be —means—.

At column 13, line 18 (claim 16, line 12) of the printed patent, "unit" should be —means—.

At column 13, line 20 (claim 16, line 14) of the printed patent, "unit" should be —means—.

At column 14, line 1 (claim 16, line 20) of the printed patent, "unit" should be —means—.

At column 14, line 3 (claim 16, line 22) of the printed patent, "unit" should be —means—.

Signed and Sealed this

Second Day of May, 2000

Attest:

Q. TODD DICKINSON

*Attesting Officer*   *Director of Patents and Trademarks*